(12) United States Patent
Goel et al.

(10) Patent No.: US 11,859,849 B2
(45) Date of Patent: Jan. 2, 2024

(54) HVAC SYSTEMS WITH EVAPORATOR BYPASS AND SUPPLY AIR RECIRCULATION AND METHODS OF USING SAME

(71) Applicant: Lennox Industries Inc., Richardson, TX (US)

(72) Inventors: Rakesh Goel, Irving, TX (US); Vijay Sathyamurthi, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 18/047,837

(22) Filed: Oct. 19, 2022

(65) Prior Publication Data

US 2023/0063742 A1    Mar. 2, 2023

Related U.S. Application Data

(63) Continuation of application No. 17/156,211, filed on Jan. 22, 2021, now Pat. No. 11,549,714, which is a continuation of application No. 16/356,841, filed on Mar. 18, 2019, now Pat. No. 10,941,958.

(51) Int. Cl.

| | | |
|---|---|---|
| *F24F 11/81* | (2018.01) | |
| *F24F 3/14* | (2006.01) | |
| *F24F 11/65* | (2018.01) | |
| *F24F 3/048* | (2006.01) | |
| *F24F 110/20* | (2018.01) | |
| *F24F 110/10* | (2018.01) | |

(52) U.S. Cl.
CPC .............. *F24F 11/81* (2018.01); *F24F 3/14* (2013.01); *F24F 11/65* (2018.01); *F24F 3/048* (2013.01); *F24F 2003/144* (2013.01); *F24F 2110/10* (2018.01); *F24F 2110/20* (2018.01)

(58) Field of Classification Search
CPC .... F24F 11/81; F24F 3/14; F24F 11/65; F24F 3/048; F24F 2003/144; F24F 2110/10; F24F 2110/20; F24F 1/0035; F24F 3/1405; Y02B 30/70
See application file for complete search history.

(56) References Cited

U.S. PATENT DOCUMENTS

| | | |
|---|---|---|
| 1,909,164 A | 5/1933 | Bulkeley |
| 2,161,312 A | 6/1939 | Pritchard |
| 2,432,587 A | 12/1947 | Ramsey |
| 2,939,296 A | 6/1960 | Coblentz |
| 2,975,609 A | 3/1961 | Allander et al. |
| 3,394,754 A | 7/1968 | Schneeberg et al. |
| 3,853,173 A | 12/1974 | Osheroff |
| 3,870,227 A | 3/1975 | Attridge, Jr. |
| 4,487,363 A | 12/1984 | Parker et al. |
| 4,829,447 A | 5/1989 | Parker et al. |

(Continued)

FOREIGN PATENT DOCUMENTS

| | | |
|---|---|---|
| DE | 3736133 A1 | 5/1989 |
| GB | 379430 A | 6/1931 |

*Primary Examiner* — Nelson J Nieves

(74) *Attorney, Agent, or Firm* — Baker Botts L.L.P.

(57) ABSTRACT

An HVAC system includes an evaporator coil disposed between a return air duct and a supply air duct. The system includes a compressor fluidically connected to the evaporator coil, and a blower for providing a flow of air through the HVAC system. A controller determines an operating mode of the HVAC system.

15 Claims, 4 Drawing Sheets

(56) References Cited

U.S. PATENT DOCUMENTS

| | | | |
|---|---|---|---|
| 4,984,433 A | | 1/1991 | Worthington |
| 5,228,306 A | | 7/1993 | Shyu et al. |
| 5,249,596 A | | 10/1993 | Hickenlooper, III et al. |
| 5,267,451 A | | 12/1993 | Cleveland |
| 6,089,464 A | | 7/2000 | Morgan |
| 7,178,545 B2 | | 2/2007 | Zelczer et al. |
| 8,915,295 B2 | | 12/2014 | Norrell et al. |
| 2012/0253524 A1 | * | 10/2012 | Norrell .................. F24F 11/30 700/277 |
| 2013/0178987 A1 | | 7/2013 | Meirav et al. |
| 2018/0112886 A1 | | 4/2018 | Boody |
| 2019/0063777 A1 | | 2/2019 | Jin et al. |
| 2019/0195528 A1 | | 6/2019 | Puranen et al. |
| 2020/0284464 A1 | | 9/2020 | Abdel-Salam et al. |

* cited by examiner

HVAC SYSTEMS WITH EVAPORATOR BYPASS AND SUPPLY AIR RECIRCULATION AND METHODS OF USING SAME

CROSS-REFERENCE TO RELATED APPLICATIONS

This application is a continuation of U.S. application Ser. No. 17/156,211 filed Jan. 22, 2021, by Rakesh Goel et al., and entitled "HVAC SYSTEMS WITH EVAPORATOR BYPASS AND SUPPLY AIR RECIRCULATION AND METHODS OF USING SAME," which is a continuation of U.S. application Ser. No. 16/356,841 filed Mar. 18, 2019, by Rakesh Goel et al., and entitled "HVAC SYSTEMS WITH EVAPORATOR BYPASS AND SUPPLY AIR RECIRCULATION AND METHODS OF USING SAME," now U.S. Pat. No. 10,941,958 issued Mar. 9, 2021 which is incorporated herein by reference.

TECHNICAL FIELD

This disclosure relates generally to heating, ventilation, and air conditioning (HVAC) systems and methods of their use. In particular, this disclosure relates to HVAC systems for improved dehumidification of air supplied to an enclosed space.

BACKGROUND

Heating, ventilation, and air conditioning (HVAC) systems are used to regulate environmental conditions within an enclosed space. Typically, HVAC systems have a blower, or recirculation fan, that pulls air from an enclosed space through a return duct and pushes the air back into the enclosed space through one or more supply air ducts after conditioning the air (e.g., heating, cooling, humidifying, or dehumidifying the air). HVAC systems generally include a controller to direct operation of the blower and other components of the system. In addition to directing operation of the HVAC system, the controller may be used to monitor various components of the HVAC system to determine if the components are functioning properly.

SUMMARY OF THE DISCLOSURE

HVAC systems are typically configured to supply an enclosed space with conditioned air that is comfortable for occupants of the space by adjusting the temperature and relative humidity of the conditioned air. The air supplied by the HVAC system has an associated temperature and an associated relative humidity. In some HVAC systems, the temperature and/or humidity of the supply air may be adjusted in order to meet the occupant's desired comfort. However, dehumidification using conventional HVAC systems is far from optimal and can result in over-cooling of the conditioned air, waste of energy, and damage to components of the HVAC system, as described in greater detail herein.

This disclosure contemplates an unconventional HVAC system that solves problems of conventional systems. The HVAC system, in certain embodiments, includes an evaporator bypass line and a supply air recirculation line which allow the HVAC system to operate under more optimal conditions for the removal of water from air. A portion of the air that would typically pass through the evaporator coil is diverted through the bypass line (i.e., and not pass through the evaporator coil), allowing the evaporator to more effectively dehumidify the air and improving the overall operation of the HVAC system. Recirculating conditioned air through the HVAC system via the supply air recirculation line also allows the system to more effectively and efficiently provide supply air to a conditioned space at a desired temperature and humidity without wasting energy and without adversely affecting the HVAC system.

According to an embodiment, an HVAC system includes an evaporator coil disposed between a return air duct and a supply air duct. The HVAC system also includes a compressor fluidically connected to the evaporator coil, and a blower disposed between the evaporator and the supply air duct for providing a flow of air through the HVAC system. The HVAC system includes a supply air recirculation line fluidically connecting the supply air duct to the return air duct and bypassing the conditioned space. The supply air recirculation line comprises a recirculation damper for adjusting a first flow of air to a conditioned space via the supply air duct and a second flow of air from the supply air duct to the return air duct via the supply air recirculation line. The HVAC system also includes an evaporator bypass line fluidically connecting the return air duct to the output airstream of the evaporator coil. The evaporator bypass line comprises a bypass damper for adjusting a third flow of air to an input of the evaporator coil and a fourth flow of air to the output of the evaporator coil via the evaporator bypass line. The HVAC system also includes a controller operatively coupled to the compressor, the blower, the recirculation damper, and the bypass damper. The controller is operable to determine a recirculation portion of the first flow of air to divert from the supply air duct to the return air duct based at least in part on a minimum operating flow rate of the blower. The controller is also operable to cause the recirculation damper to move to divert the recirculation portion of the first flow of air from the supply air duct to the return air duct via the supply air recirculation line. The controller is operable to determine an operating mode of the HVAC system. The controller is also operable to determine a bypass portion of the third flow of air to divert from the return air duct to the output of the evaporator coil based at least in part on the operating mode of the HVAC system. The controller is also operable to cause the bypass damper to move to divert the bypass portion of the third flow of air from the return air duct to the output of the evaporator coil via the evaporator bypass line.

According to another embodiment, an HVAC system includes an evaporator coil disposed between a return air duct and a supply air duct, a compressor fluidically connected to the evaporator coil, and a blower disposed between the evaporator and the supply air duct for providing a flow of air through the HVAC system. The HVAC system also comprises an evaporator bypass line fluidically connecting the return air duct to an output of the evaporator coil. The evaporator bypass line comprises a bypass damper for adjusting a first flow of air to an input of the evaporator coil and a second flow of air to the output of the evaporator coil via the evaporator bypass line. The HVAC system also comprises a controller operatively coupled to the compressor, the blower, and the bypass damper. The controller is operable to determine an operating mode of the HVAC system. The controller is operable to determine a bypass portion of the first flow of air to divert from the return air duct to the output of the evaporator coil based at least in part on the operating mode of the HVAC system. The controller is operable to cause the bypass damper to move to divert the bypass portion of the first flow of air from the return air duct to the output airstream of the evaporator coil via the evaporator bypass line.

Certain embodiments provide one or more technical advantages including or in addition to those described above. For example, an embodiment reduces energy waste by reducing unnecessary cooling of the flow of air to achieve a desired relative humidity. As another example, an embodiment allows a portion of the flow of air from the return air duct to bypass the evaporator coil so that evaporator coil may more effectively remove moisture from the flow of air while at the same time maintaining adequate ventilation airflow needs in the conditioned space. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
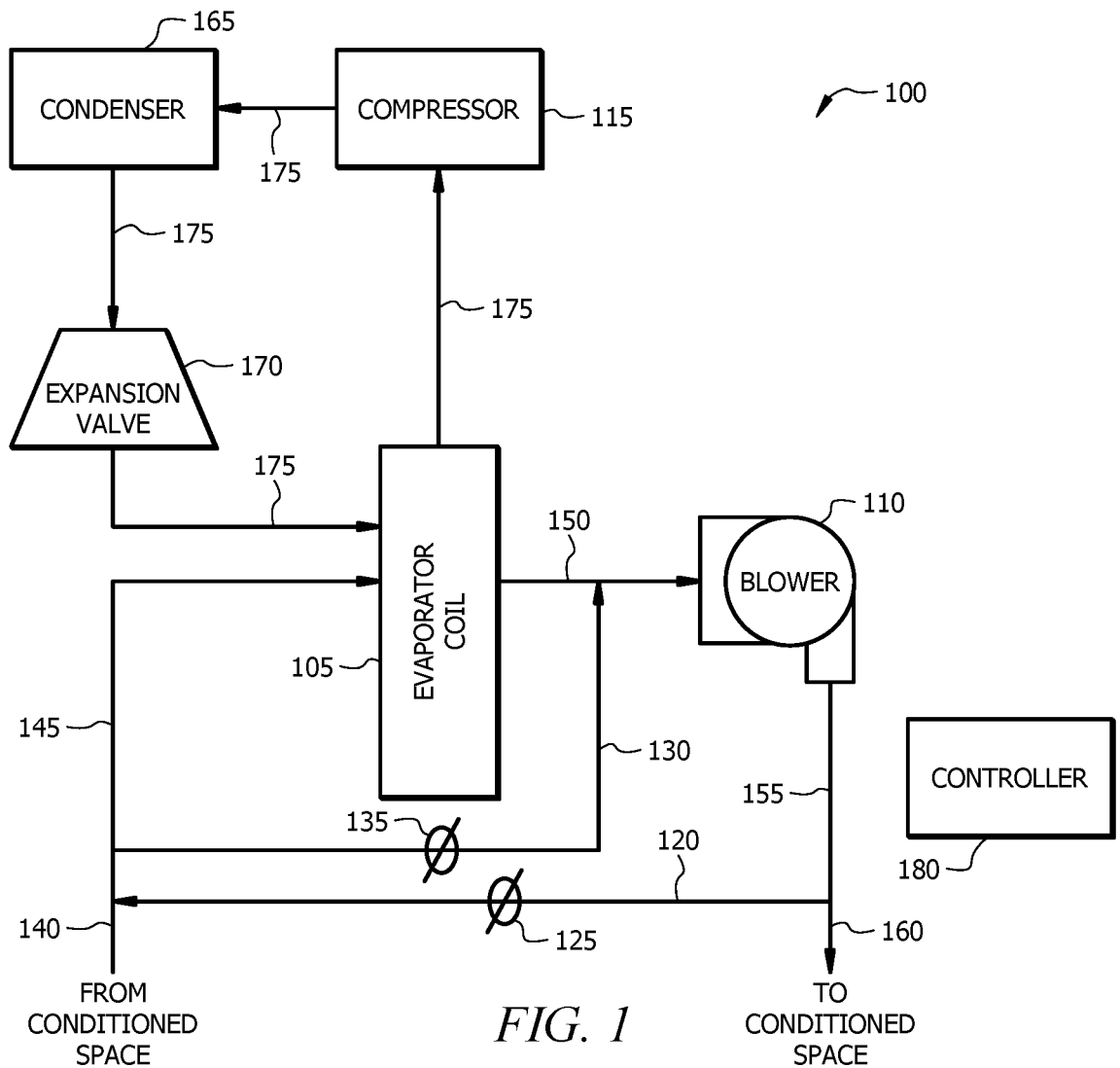
FIG. 1 illustrates an HVAC system, according to certain embodiments of the present disclosure.

Embodiments of the present disclosure and its advantages are best understood by referring to FIGS. 1 through 5 of the drawings, like numerals being used for like and corresponding parts of the various drawings.

As described above, HVAC systems are typically configured to supply an enclosed space with conditioned air that is comfortable for occupants of the space. The air supplied by the HVAC system has an associated temperature and an associated relative humidity. In some HVAC systems, the temperature and/or humidity of the supply air may be adjusted (e.g., using a thermostat) in order to meet the occupant's desired comfort.

However, dehumidification using conventional HVAC systems is far from optimal. This is because an HVAC system's ability to dehumidify air in an enclosed space is tied to the extent to which the HVAC system cools the air in the enclosed space. Indeed, HVAC systems remove moisture from the air by circulating moisturized air over and/or through evaporator coils that are colder in temperature than the moisturized air (e.g., because of the temperature of refrigerant circulating through the evaporator coils). As a result of heat-exchange principles, the circulating air is cooled and the moisture from the moisturized air condenses on the evaporator coils, thereby producing dehumidified cold air which may then be directed to an enclosed space via a return air duct. Generally, an HVAC system ceases to operate once a predetermined temperature has been reached. For example, most HVAC systems will discontinue operation once an enclosed space has reached a programmed temperature setpoint (e.g., 73° F.). Although the temperature of the enclosed space may be at a desired temperature setpoint (e.g., 73° F.) when the HVAC system ceases operation, the relative humidity of the enclosed space may not be at a desired humidity value (e.g., 80% relative humidity). In such cases, the temperature setpoint may be adjusted to an undesirably low temperature (e.g., 65° F.) in order to decrease the relative humidity of the enclosed space to a more desirable value (e.g., 44% relative humidity).

The extent of cooling and dehumidification an HVAC system can achieve is generally determined by its sensible capacity (Sc) and latent capacity (Lc). Each HVAC system has a total capacity (Tc), which is calculated as the sum of the sensible capacity and a latent capacity (i.e., Tc=Sc+Lc). Generally, sensible capacity refers to an ability of the HVAC system to remove sensible heat from conditioned air (e.g., to cool the air). As used herein, sensible heat refers to heat that, when added to or removed from the air, results in a temperature change of the conditioned air. Comparatively, latent heat refers to the ability of an HVAC system to remove latent heat from conditioned air (e.g., to dehumidify the air). As used herein, latent heat refers to heat that, when added to or removed from the conditioned air, results in a phase change of, for example, water within the conditioned air. Sensible capacity and latent capacity may vary with environmental conditions.

A sensible-to-total ratio ("SIT Ratio"), calculated using sensible and latent capacity values where S/T Ratio=Sc/Tc, may represent the comfort of an occupant within a conditioned space. Generally, a lower S/T ratio is indicative of a greater capacity for dehumidification, while a higher S/T ratio is indicative of a lesser capacity for dehumidification. Thus, if the sensible capacity value is very high, the HVAC system will have a high S/T ratio (e.g., 0.9). In the example of a 0.9 S/T ratio, the HVAC system is devoting 90% of its total capacity to removing sensible heat and 10% of its total capacity to remove latent heat. Such a scenario may lead to humidity problems.

As described above, an existing approach to achieving a substantially low S/T ratio for air dehumidification involves lowering the temperature setpoint of the HVAC system until the desired dehumidification is achieved. This approach reduces both the temperature and humidity of the conditioned air. However, this approach causes the HVAC system to operate for longer periods of time than if the temperature setpoint of the HVAC system were set to a higher temperature. As such, this approach results not only in over-cooling of the conditioned air (and the consequent occupant discomfort) but also wasted energy for the extended HVAC system run times. Another approach to air dehumidification involves re-heating air leaving the evaporator coil of the system. While this approach can provide conditioned air at a more comfortable temperature for occupants, additional energy is wasted, as energy is expended to first over-cool the air to achieve a comfortable relative humidity value before the air is re-heated to achieve a more comfortable temperature for occupants.

The present disclosure provides solutions to the above-described problems and encompasses the recognition that the S/T ratio of an HVAC system can be optimized, by operating the HVAC system at a predetermined optimal rate of air flow per ton of cooling provided by the compressor. For example, in HVAC systems with a variable-speed compressor, the compressor speed, may be modulated. Similarly, a rate of air flow provided by the blower (e.g., a blower "speed") may be adjusted to achieve a desired predetermined rate of airflow per actual ton of cooling for a given operating mode.

In practice, however, appropriately adjusting the rate of airflow per actual ton of cooling for an HVAC system can be difficult or impossible because of mechanical limitations of the blower. A blower generally has a minimum flow rate at which it is designed to operate (e.g., a minimum rated speed that is established by the manufacturer of the blower). Additionally, flow rate cannot generally be decreased below a minimum target flow rate that is required to properly service (e.g., cool and/or dehumidify) a given space. For instance, low flow rates can result in poor air distribution within a large conditioned space, such as a large non-residential space that comprises multiple sub-spaces, each of which requires an adequate flow of conditioned air. An office building, for example, may require a certain minimum air flow rate to ensure substantial airflow is received in offices that are distant from the blower.

It is also generally difficult or impossible, in some instances, to adjust the rate of airflow per actual ton of cooling by increasing the speed of the compressor of the HVAC system, because operating a compressor at an excessively high speed can adversely impact the HVAC system by decreasing its performance and possibly damaging itself and/or other components of the HVAC system. Increasing the speed of the compressor can result in over-cooling of the air. To prevent the conditioned space from being cooled to an uncomfortably low temperature, the compressor will also need to cycle on and off at a greater frequency. This cycling can cause re-evaporation of the moisture on the evaporator coil in the system, which will counterproductively increase the humidity of the air supplied to the conditioned space. This increased frequency of power cycling can stress the compressor and other components of the HVAC system, resulting in increased maintenance costs and an increased probability of premature system failure. Additionally, when the compressor is operated at a high speed, the turndown ratio, or the ratio of the maximum and minimum discharge pressures of the compressor, is generally decreased resulting in a narrower operational range of cooling and dehumidification for the HVAC system.

This disclosure contemplates an unconventional HVAC system that includes an evaporator bypass line and a supply recirculation line which allow the S/T ratio of the HVAC system to be optimized while mitigating the problems described above. Recirculating conditioned air through the HVAC system effectively decreases the temperature and humidity of the return air directed to the evaporator coil of the HVAC system, allowing the system to more effectively dehumidify this air. In the systems described herein, a damper in the recirculation line can be moved (e.g., to an appropriate angle) to divert a portion of the flow of conditioned air to recirculate back through the HVAC system. For example, the portion of the flow of conditioned air that is not needed to the conditioned space (e.g., the flow that is in excess of a target air flow required by the HVAC system) can be recirculated through the HVAC system to improve the S/T ratio of the system.

A bypass damper in the bypass line can similarly be used to improve the S/T ratio of the HVAC system. The bypass damper can be moved (e.g., to an appropriate angle) to divert a portion of the air that would normally pass through the evaporator coil (i.e., return air+any recirculated supply air from the supply recirculation line) to bypass the evaporator coil. Causing air to bypass the evaporator coil results in a decreased flow of air through the evaporator coil. When the flow of air through the evaporator coil is decreased, the airside convective heat transfer coefficient is reduced, which lowers the coil temperature leading to higher dehumidification or latent capacity at the expense of decreased sensible and total cooling capacities. This results in an improved S/T ratio.

FIG. 1 illustrates an HVAC system, according to an illustrative embodiment of the present disclosure. In a typical embodiment, HVAC system 100 is configured to condition a flow of air (e.g., by cooling and dehumidifying the flow of air) that is received via a return air duct 140 and supplying the conditioned air to a conditioned space via a supply air duct 160. The conditioned space may be, for example, a house, an office building, a warehouse, or the like. Thus, HVAC system 100 can be a residential system or a commercial system such as, for example, a roof-top system. For exemplary illustration, the HVAC system 100 as illustrated in FIG. 1 includes various components. However, in other embodiments, the HVAC system 100 may include additional components that are not illustrated but typically included within HVAC systems.

HVAC system 100 includes an evaporator coil 105, a blower 110, a compressor 115, and a controller 180. HVAC system 100 also includes a supply air recirculation line 120 with a recirculation damper 125 disposed therein and an evaporator bypass line 130 with a bypass damper 135 disposed therein. The recirculation damper 125 of supply air recirculation line 120 can be moved to divert a portion of the supply air from the supply air duct 160 to the return air duct 140 to improve the removal of water from air passing through the HVAC system. Evaporator bypass line 130 allows a portion of air from the return line 140 to be bypassed around evaporator coil 105 so that the portion of air does not pass through the evaporator coil 105. This allows the flow of air to the conditioned space and the flow of air through the evaporator coil 105 to be decreased while the flow of air through the blower 110 is maintained at or above its minimum flow rate. This also facilitates improved dehumidification of air passing through the HVAC system 100. In general, the various air lines, including the supply air recirculation line 120 and the evaporator bypass line 130, and ducts, including the return air duct 140 and the supply air duct 160, may be any appropriate duct or passage for facilitating a directed flow of air.

The blower 110 is any mechanism for providing a flow of air through the HVAC system 100. For example, the blower 110 may be a constant-speed or variable-speed circulation fan. In certain embodiments, it may be beneficial for the blower 110 to be operable at different capacities (i.e., variable motor speeds) to circulate air through the HVAC system 100 at different flow rates.

The evaporator coil 105 is generally a heat exchanger for providing heat transfer between air flowing through the evaporator coil (i.e., contacting the outer surface of the evaporator coil 105) and refrigerant 175 passing through the interior of the evaporator coil 105. The evaporator coil 105 is fluidically connected to the compressor 115, such that refrigerant 175 flows from the evaporator coil 105 to the compressor 115.

During operation, low-pressure, low-temperature refrigerant 175 is circulated through the evaporator coil 105. Refrigerant 175 is initially in a liquid/vapor state upon entering the evaporator coil 105. In a typical embodiment, the refrigerant 175 is, for example, R-410A, R-134a, R-22, R-744, or any other suitable type of refrigerant as appropriate for particular design requirements. Air entering the evaporator coil 105 via air line 145 is typically warmer than the refrigerant 175 entering the evaporator coil 105 and is circulated through or around the evaporator coil 105 by the blower 110. In a typical embodiment, the refrigerant 175 in the evaporator begins to boil after absorbing heat from the air and changes state to a low-pressure (compared to the condenser), super-heated vapor refrigerant 175. Saturated vapor, saturated liquid, and saturated fluid refers to a thermodynamic state where a liquid and its vapor exist in approximate equilibrium with each other. Super-heated fluid and super-heated vapor refer to a thermodynamic state where a vapor is heated above a saturation temperature of the vapor at a given pressure. Sub-cooled fluid and sub-cooled liquid refers to a thermodynamic state where a liquid is cooled below the saturation temperature of the liquid at a given pressure.

The low-pressure, low-temperature, super-heated vapor refrigerant 175 from the evaporator coil 105 is directed to the compressor 115. The compressor 115 may be a constant-speed or variable-speed compressor and may have a single stage or multiple stages. In a typical embodiment, the compressor 115 increases the pressure and temperature of the low-pressure, low-temperature, super-heated vapor refrigerant 175 to form a high-pressure, high-temperature, superheated vapor refrigerant 175, which exits the compressor 115 and is directed to the condenser coil 165.

Outside air is circulated around the condenser coil 165, for example, by a condenser fan. The outside air is typically cooler than the high-pressure, high-temperature, super-heated vapor refrigerant 175 that enters the condenser coil 165. Thus, heat is transferred from the high-pressure, high-temperature, superheated vapor refrigerant 175 to the outside air. Removal of heat from the high-pressure, high-temperature, superheated vapor refrigerant causes the high-pressure, high-temperature, superheated vapor refrigerant 175 to condense and change from a vapor state to a high-pressure, high-temperature, sub-cooled liquid state. In certain embodiments, the HVAC system 100 may include a three-way valve (not shown) to divert at least a portion of the high-pressure, high-temperature, superheated vapor refrigerant from compressor 115 to a re-heat coil (not shown) positioned in the supply air duct 160. The re-heat coil facilitates transfer of a portion of the heat stored in the high-pressure, high-temperature, superheated vapor refrigerant 175 to the flow of air in the supply air duct 160 thereby heating the flow of air output to the conditioned space.

The high-pressure, high-temperature, sub-cooled liquid refrigerant 175 exits the condenser coil 165 and is directed to a metering device 170, which abruptly reduces the pressure of refrigerant 175. The metering device 170 may be a thermostatic expansion valve. Abrupt reduction of the pressure of the high-pressure, high-temperature, sub-cooled liquid refrigerant 175 also causes sudden, rapid, evaporation of a portion of the high-pressure, high-temperature, sub-cooled liquid refrigerant 175, commonly known as "flash evaporation." Flash evaporation lowers the temperature of the resulting liquid/vapor refrigerant mixture to a temperature lower than a temperature of the air in the conditioned space. The liquid/vapor refrigerant mixture leaves the metering device 170 and returns to the evaporator coil 105. While the illustrative example of FIG. 1 includes the components described above, fewer, more, or other components may be used to achieve an appropriate flow of low-pressure, low-temperature refrigerant to the evaporator coil 105.

The controller 180 is operatively coupled to the compressor 115, the blower 110, the recirculation damper 125, and the bypass damper 135 and is operable to cause dampers 125 and 135 to move based on determinations related to monitored properties of the HVAC system 100 and/or the conditioned space, as described in greater detail herein. The controller 180 may be an integrated controller or a distributed controller that directs operation of the HVAC system 100. In a typical embodiment, the controller 180 includes an interface to receive, for example, thermostat calls, temperature setpoints, blower control signals, environmental conditions, and operating mode status for the HVAC system 100. For example, in a typical embodiment, the environmental conditions may include indoor temperature and relative humidity of the conditioned space. In a typical embodiment, the controller 180 also includes a processor and a memory to direct operation of the HVAC system 100 including, for example, an angle to which the bypass damper 135 should be moved to direct a desired portion of the flow of air from the return air duct passed the evaporator coil (without passing through the evaporator coil).

The processor of the controller 180 is any electronic circuitry, including, but not limited to microprocessors, application specific integrated circuits (ASIC), application specific instruction set processor (ASIP), and/or state machines, that communicatively couples to memory and controls the operation of HVAC system 100. The processor of controller 180 may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware and software that operates to control and process information. The processor executes software stored on memory of the controller 180 to perform any of the functions described herein. The processor may be a programmable logic device, a microcontroller, a microprocessor, any suitable processing device, or any suitable combination of the preceding. The processor is not limited to a single processing device and may encompass multiple processing devices. Similarly, the controller 180 is not limited to a single controller but may encompass multiple controllers.

Memory of controller 180 may store, either permanently or temporarily, data, operational software, or other information for a processor of the controller 180. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory, a disk, a CD, or a flash drive. In particular embodiments, the software may include an application executable by a processor of controller 180 to perform one or more of the functions described herein.

The HVAC system 100 may also include environment sensors to provide environmental information about the conditioned space (e.g., temperature and humidity of the conditioned space) to the controller 180. The sensors may also send environmental information to a display of a user interface of HVAC system 100. In some embodiments, the user interface provides additional functions such as, for example, displaying operational, diagnostic, and status messages and providing a visual interface that allows at least one of an installer, a user, a support entity, and a service provider to perform actions with respect to the HVAC system 100. For example, the user interface may be a thermostat of the HVAC system 100.

In certain embodiments, connections between various components of the HVAC system 100 are wired. For example, conventional cable and contacts may be used to couple the controller 180 to the various components of the HVAC system 100, including the blower 110, the compressor 115, the recirculation damper 125, and the bypass damper 135. In some embodiments, a wireless connection is employed to provide at least some of the connections between components of the HVAC system such as, for example, a connection between controller 180 and the variable-speed circulation fan 110 or any environment sensors of system 100. In some embodiments, a data bus couples various components of the HVAC system 100 together such that data is communicated there between. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 180 to other components of the HVAC system 100.

The evaporator bypass line 130 is fluidically connected to the air line 150 that fluidically connects the outlet of the evaporator coil 105 to the inlet of the blower 110. The bypass damper 135 of the evaporator bypass line 130 may be a motorized damper which is electronically adjustable based on a signal received from the controller 180. The bypass damper 135 is operable to direct a first portion of the flow of air from the return airduct 140 to the evaporator coil 105 via air line 145 and a second portion of the flow of air from the return airduct 140 to the inlet of the blower 110 or to air line 150, via the evaporator bypass line 130. The controller 180 is operable to cause the bypass damper 135 to move in order to decrease the first portion of the flow of air from the return airduct 140 that is directed to the inlet of the evaporator via airline 145 and to increase the second portion of the flow of air from the return airduct 140 that is diverted passed the evaporator coil 105 via the evaporator bypass line 130. This allows the total flow of air through the HVAC system 100 to reach the blower 110, while a decreased flow of air passes through the evaporator coil 105. In some instances, the evaporator coil 105 more effectively dehumidifies the flow of air when a decreased flow of air passes through the evaporator coil 105, as described in greater detail herein.

The supply air recirculation line 120 fluidically connects the supply air duct 160 to the return air duct 140. The recirculation damper 125 of the supply air recirculation line 120 may be a motorized damper which is electronically adjustable based on a signal received from the controller 180. The recirculation damper 125 is operable to direct a first portion of a flow of air from the blower 110 to a conditioned space via the supply air duct 160. The recirculation damper 125 is also operable to direct a second portion of air from the supply air duct 160 to the return air duct 140 via the supply air recirculation line 120. The controller 180 is operable to cause the recirculation damper 125 to move (e.g., to an adjusted angle) to decrease the first portion of the flow of air supplied to the conditioned space and to increase the second portion of the flow of air directed to the return airduct 140. This allows a portion of the conditioned air to be recirculated through the HVAC system 100 (i.e., recirculated towards the evaporator coil 105 for further cooling and/or dehumidification), while the blower 110 still provides the total flow of air required for proper operation. As described in greater detail herein with respect to FIGS. 4 and 5, recirculating conditioned air through the HVAC system improve dehumidification performance of the HVAC system 100.

While the illustrative embodiment of FIG. 1 includes the supply air recirculation line 120 and the recirculation damper 125, other embodiments of the HVAC system 100 (not shown) do not include the recirculation line 120 or the recirculation damper 125 disposed therein, as described in greater detail below, for example, with respect to FIG. 3.

In an example operation of the HVAC system 100, a flow of air is provided through HVAC system 100 by the blower 110. In the illustrative example of FIG. 1, the flow of air is provided to air line 155 which fluidically connects the output of blower 110 to the supply air duct 160 and the supply air recirculation line 120. The controller 180 determines a portion of this flow of air to recirculate through the HVAC system 100 (via the supply air recirculation line 120), rather than to supply to the conditioned space (via the supply air duct 160). This determination can be made, for example, by determining whether a minimum flow rate of the blower is greater than a predetermined supply air flow rate of the HVAC system 100. The predetermined supply air flow rate of the HVAC system 100 may be based on design specifications of the space being cooled and/or dehumidified by HVAC system 100, as described herein. For example, a minimum rate of air flow may be required to provide an adequate flow of air throughout the conditioned space, and any excess flow of air beyond this minimum rate of air flow may be recirculated through the HVAC system 100 to improve dehumidification.

The controller 180 then determines the portion of the flow of air to recirculate through the HVAC system via the supply air recirculation line 120. The controller 180 then causes the recirculation damper 125 to move (e.g., to an appropriate angle) such that the determined portion of the flow of conditioned air is diverted through the supply air recirculation line 120. For example, if the required supply flow rate of the condition space is 800 CFM and the minimum flow rate of the blower is 900 CFM, controller 180 may determine that 100 CFM (i.e., 900 CFM-800 CFM) of air is to be recirculated through the HVAC system via the supply air recirculation line 120. Controller 180 then causes recirculation damper 125 to move to an appropriate angle to direct 100 CFM of air through supply air recirculation line 120. Although 800 CFM is provided to the conditioned space, blower 110 still provides the required minimum flow of 900 CFM, thereby allowing the blower 110 to function properly while system performance is improved via recirculation of conditioned air through the HVAC system 100.

The controller 180 then determines how much air to divert through bypass line 130 to prevent this portion of the flow of air from passing through the evaporator coil 105. Thus, the flow of air through the evaporator coil 105 is decreased, while the blower 110 still operates at its full minimum flow of air, corresponding to the flow of air through air line 150 and bypass line 130. As described herein, decreasing the flow of air through the evaporator coil 105 (i.e., the air provided from air line 145 of FIG. 1) facilitates improved removal of water from the air passing through the evaporator coil 105.

To determine a portion of the flow of air from the return air duct to divert through bypass line 130, the controller 180 first determines an operating mode of the HVAC system 100. Typically, the controller 180 determines whether the system is operating in a cooling mode or dehumidification mode. Each mode is associated with a corresponding threshold value for the ratio of (i) the speed of the blower in terms of the rate of air flow provided by the blower (e.g., in CFM) to (ii) the compressor speed (e.g., in terms of a tonnage). For example, this threshold value may be 400 CFM/Ton for a cooling mode and 200 CFM/Ton for a dehumidification mode. It should be understood that these are example threshold values, and different threshold values may be appropriate, for example, depending on environmental conditions, design specifications of the HVAC system 100 and/or characteristics of the conditioned space.

The controller 180 then determines whether the ratio of (i) the flow of air provided by the blower 110 to (ii) the speed of the compressor 115 is greater than the predetermined threshold value for the operating mode. For example, for a blower operating at 900 CFM and a compressor operating at 1.5 Ton, this ratio is 600 CFM/Ton (i.e., 900 CFM/1.5 Ton), which is greater than the threshold value of 400 CFM/Ton for the cooling mode and the threshold value of 200 CFM/Ton for the dehumidification mode.

Responsive to this determination that the ratio (600 CFM/Ton) is greater than the predetermined threshold value for the operating mode (e.g., 400 CFM/Ton for the cooling mode), the controller then determines a portion of the flow rate of air from the return air duct to divert to the bypass line 130. The controller 180 determines the portion of air to pass through evaporator coil 105 based on the threshold value for the operating mode such that the ratio of (i) the flow of air passing through evaporator coil 105 (via air line 145) to (ii) the speed of the compressor is approximately equal to the threshold value. For example, in the example cooling mode, 600 CFM of air (400 CFM/Ton×1.5 Ton) should be directed to the evaporator coil 105 via air line 145. In the example dehumidification mode, 300 CFM (200 CFM/Ton×1.5 Ton) of air should be directed to the evaporator coil 105 via air line 145. The controller 180 then causes the bypass damper 135 to move (e.g., to an appropriate angle) to direct the determined flow of air for the operating mode to the evaporator coil 105. The remaining flow of air is diverted to the bypass line 130 in order to bypass the evaporator coil 105.

Figure 2:
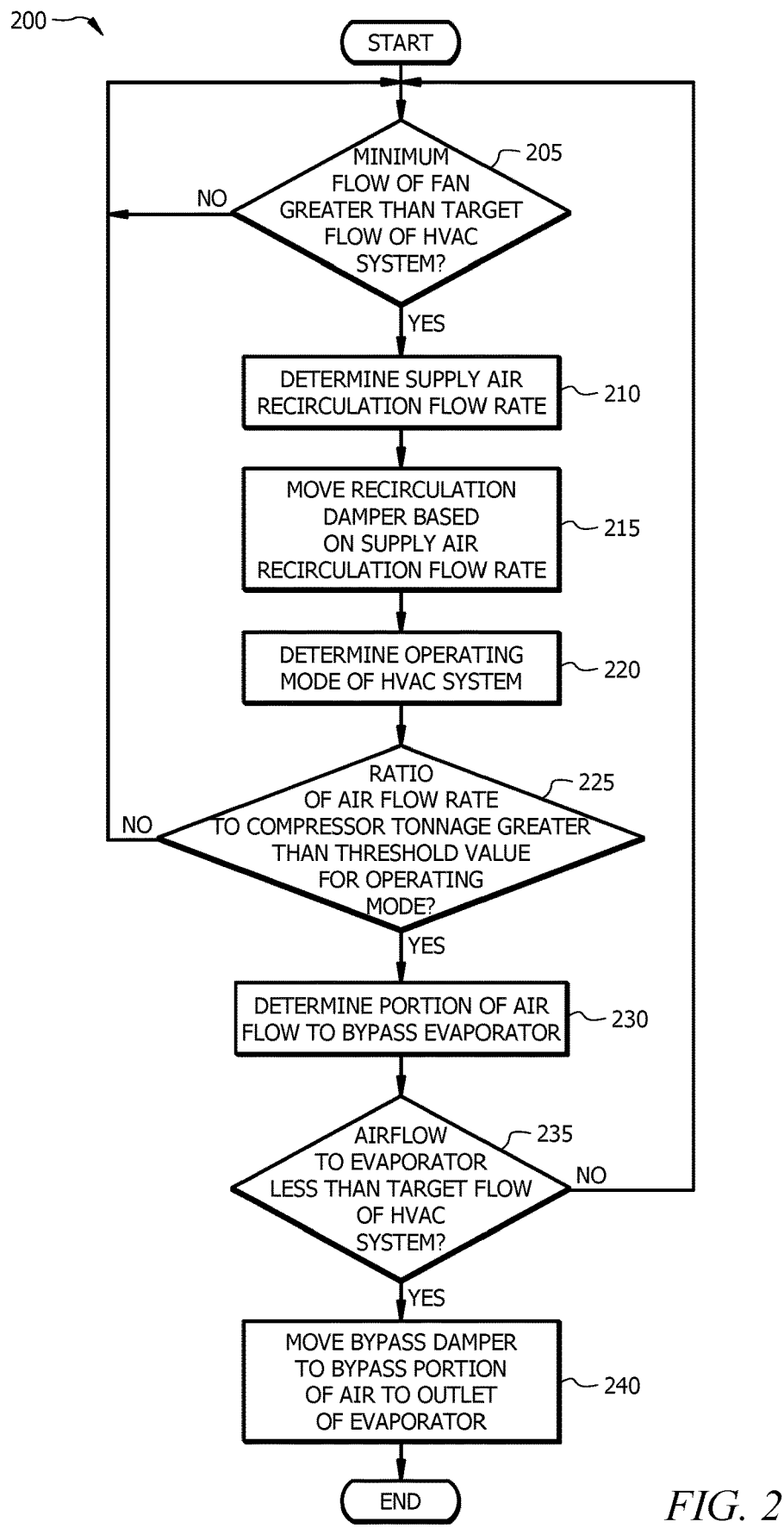
FIG. 2 is a flowchart illustrating a method of operating the HVAC system with an evaporator bypass line and a supply air recirculation line, according to certain embodiments.

FIG. 2 is a flow chart illustrating a method 200 for operating an HVAC system, according to an illustrative embodiment of the present disclosure. In particular embodiments, the HVAC system 100 of FIG. 1 performs method 200. By preforming method 200, the HVAC system 100 more effectively dehumidifies air without over-cooling the conditioned space or requiring compressor 115 to operate at an excessively high speed, which can result in problems such as the production of moisture in HVAC system 100 and damage to the compressor 115 or other components of the HVAC system 100.

In step 205, the controller 180 of the HVAC system 100 may first determine whether a minimum flow of the blower 110 is greater than a predetermined or target flowrate of the HVAC system 100. If this condition is met, the controller 180 proceeds to step 210 and determines a recirculation portion of the flow of air from the supply air duct 160 to divert to the return air duct 140 via the supply air recirculation line 120. This determination is based at least in part on a minimum operating flow rate of the blower 110. For example, the portion of the flow of air to divert through the supply air recirculation line 120 may be determined based on a difference between the minimum operating flow rate of the blower 110 and the predetermined supply air flow rate required for the HVAC system. For example, if the target flow rate to the conditioned space is 800 CFM and the blower 110 has a minimum air flow rate of 900 CFM, then 100 CFM (900 CFM-800 CFM) of air may be determined as the recirculation portion of the flow of air to divert to the supply air recirculation line 120.

In step 215, the controller 180 causes the recirculation damper 125 disposed in the supply air recirculation line 120 to move so the recirculation portion of the flow of air is diverted to the return air duct 140 through the supply air recirculation line 120. For example, the controller 180 may transmit a signal to the recirculation damper 125 which causes the damper 125 to move to an appropriate angle to achieve the appropriate flow of recirculated air through the supply air recirculation line 120.

In step 220, the controller determines an operating mode of the HVAC system. For example, the operating mode may be a cooling mode or dehumidification mode. As described elsewhere herein, each mode may have a predetermined threshold ratio value for the desired rate of airflow per actual ton of cooling. This predetermined threshold ratio value may be 400 CFM/Ton for a cooling mode and 200 CFM/Ton for a dehumidification mode.

In step 220, the controller may determine whether the rate of airflow provided by the blower 110 per actual ton of cooling by the compressor 115 is greater than the threshold ratio value for the operating mode. If this ratio is greater than the threshold value, the controller proceeds to step 230.

In step 230, the controller 180 determines a portion of the flow of air from the return air duct 140 (i.e., the flow of air which would normally pass through the evaporator coil 105) to divert through the bypass line 130 to bypass the evaporator coil 105. In other words, the controller 180 determines a bypass portion of the flow of air from the return air duct to divert to an output of the evaporator coil 105 through the evaporator bypass line 130. This determination is based at least in part on the operating mode of the HVAC system. For example, the portion of air to bypass the evaporator coil 105 may be determined such that the ratio of the flow passing through the evaporator coil 105 via air line 145 to the speed of the compressor 115 is approximately equal to the threshold ratio value for the operating mode. For example, if the total flow of air in the return air duct 140 is 900 CFM and the HVAC system 100 has a 1.5 Ton compressor 115 and is operating in a cooling mode (threshold ratio value=400 CFM/Ton), then the desired flow of air to pass through the evaporator coil 105 may be 600 CFM (400 CFM/Ton×1.5 Ton). The flow of air to divert to the bypass line 130 is thus 300 CFM (900 CFM-600 CFM). This allows an optimal flow of air (600 CFM) to flow through the evaporator coil 105, while the blower 110 functions at its required minimum air flow rate required for proper operation, 900 CFM (600 CFM received from the outlet of the evaporator coil 105+300 CFM received from the bypass line 130).

In step 235, the controller 180 may determine whether airflow to the evaporator coil 105 is less than the predetermined target flow of the HVAC system 100. If the flow of air to the evaporator coil 105 is greater than the target flow, then air is not required to bypass the evaporator coil 105 and the controller returns to the start of method 300. Otherwise, if the flow of air directed to the evaporator coil 105 is less than the target flow of the HVAC system 100, the controller 180 proceeds to step 240.

In step 240, the controller 180 causes the bypass damper 135 to move to divert the bypass portion (determined in step 230) of the flow of air from the return air duct 140 to the output of the evaporator coil 105 via the evaporator bypass line 130. For example, the controller 180 may transmit a signal to the bypass damper 135 which causes the damper 135 to move to an appropriate angle to achieve the appropriate flow of bypass air through the evaporator bypass line 130.

Modifications, additions, or omissions may be made to method 200 depicted in FIG. 2. Method 200 may include more, fewer, or other steps. For example, steps may be performed in parallel or in any suitable order. While primarily discussed as HVAC system 100 (or components thereof) performing the steps, any suitable HVAC system or any suitable components of the HVAC system may perform one or more steps of the methods.

As described above, in certain embodiments, system 100 does not include a supply air recirculation line 120. For example, dehumidification can be improved with the bypass line 130 alone. The example method 300 illustrated in FIG. 3 can be used to operate such a system.

If in step 305, the controller 180 may determine whether the rate of air flow provided by the blower 110 is equal to the minimum required air flow of the blower 110. In other words, the controller 180 determines whether the speed of the blower 110 can be decreased. If the blower 110 is not at its minimum flow rate, the controller 180 may proceed to step 330 to determine whether the flowrate is greater than or equal to some threshold times the minimum flowrate. If this condition is met, the damper is moved to a fully closed position so that no airflow bypasses the evaporator coil 105 (step 335). The controller 180 may also cause the blower 110 to operate at a decreased flow rate. Otherwise, referring again to step 305, if the blower 110 is at the minimum flow rate, the controller 180 proceeds to step 310.

In step 310, the controller 180 determines an operating mode of the HVAC system. For example, the operating mode may be a cooling mode or dehumidification mode. As already described, each mode may have a predetermined threshold ratio value for the desired rate of airflow per actual ton of cooling. This predetermined threshold ratio value may be, for example, 400 CFM/Ton for a cooling mode and 200 CFM/Ton for a dehumidification mode.

In step 315, the controller may determine whether the rate of airflow provided by the blower 110 per actual ton of cooling by the compressor 115 is greater than the threshold ratio value for the operating mode. If this ratio is greater than the threshold value, the controller 180 proceeds to step 320. Otherwise, the controller returns to the start of method 300 to monitor operating parameters of the HVAC system.

In step 320, the controller 180 determines a portion of the flow of air from the return air duct 140 (i.e., the flow of air which would normally pass through the evaporator coil 105) to bypass the evaporator coil 105. In other words, the controller 180 determines a bypass portion of the flow of air from the return air duct 140 to divert to an output of the evaporator coil 105 through the evaporator bypass line 130. This determination is based at least in part on the operating mode of the HVAC system, as described above with respect to step 230 of method 200.

In step 325, the controller 180 causes the bypass damper 135 to move to divert the bypass portion of the flow of air from the return air duct 140 to the output of the evaporator coil 105 via the evaporator bypass line 130. For example, the controller 180 may transmit a signal to the bypass damper 135 which causes the damper 135 to move to an appropriate angle to achieve the appropriate flow of bypass air through the evaporator bypass line 130.

Figure 3:
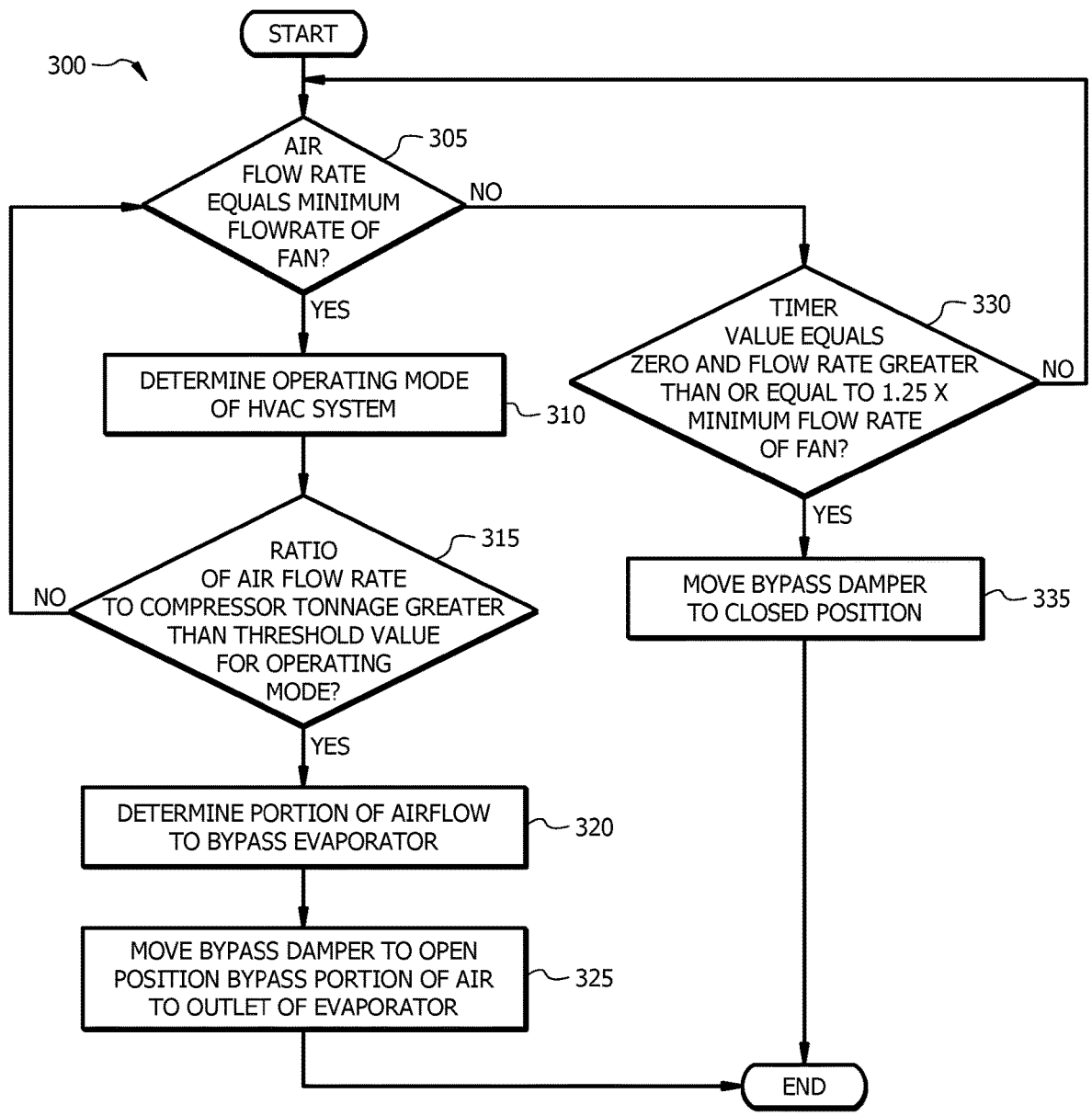
FIG. 3 is a flowchart illustrating a method of operating an HVAC system with an evaporator bypass line, according to certain embodiments.

Modifications, additions, or omissions may be made to method 300 depicted in FIG. 3. Method 300 may include more, fewer, or other steps. For example, steps may be performed in parallel or in any suitable order. While at times discussed as HVAC system 100 (or components thereof) performing the steps, any suitable HVAC system or components of the HVAC system may perform one or more steps of the method.

Figure 4:
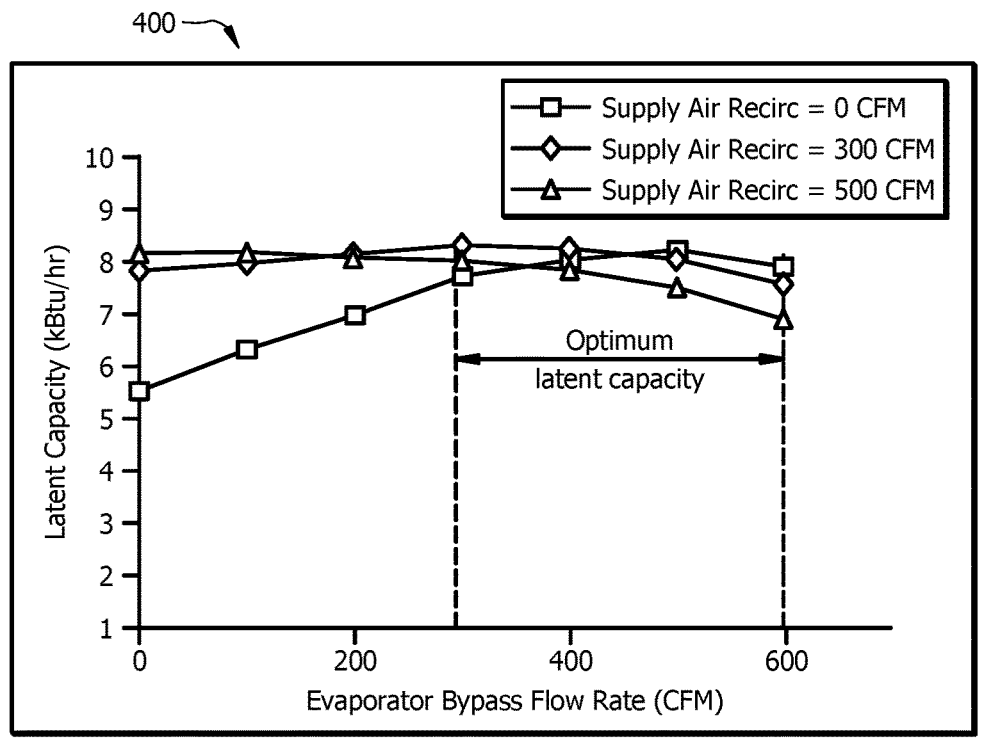
FIGS. 4 and 5 are graphs of example performance metrics of an HVAC system operating with different flows of air diverted through the supply air recirculation line and the evaporator bypass line.
Figure 5:
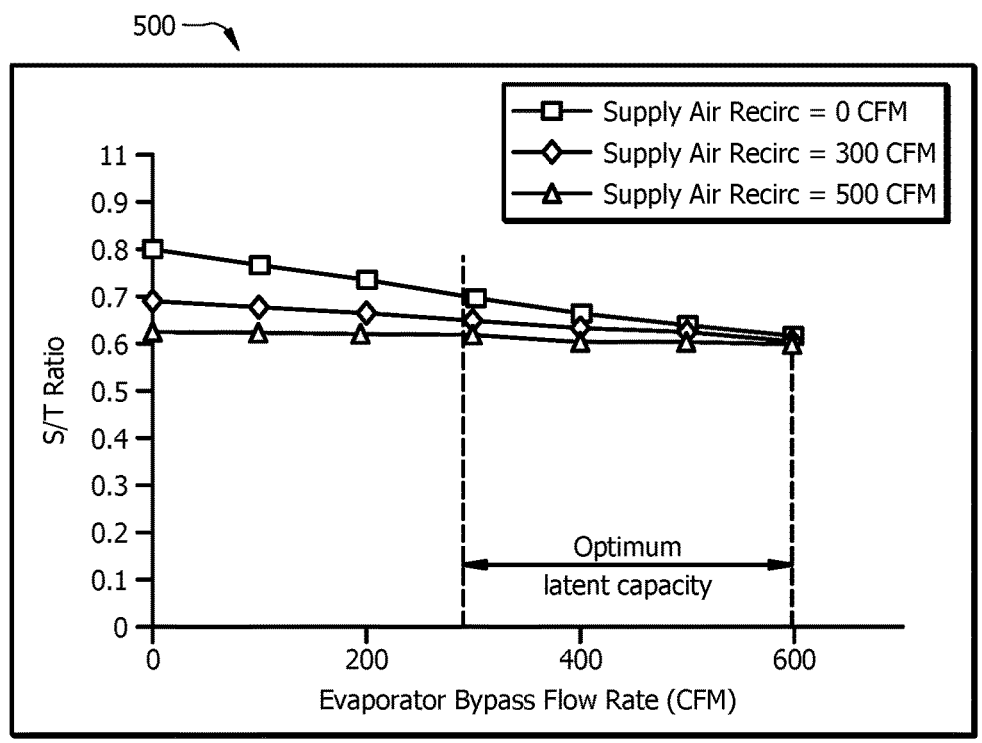

As described above, the systems apparatus, and methods described herein provide various advantages and improvements for the dehumidification of air by the HVAC system 100. FIGS. 4 and 5 show plots 400 and 500, respectively, of example performance metrics of the HVAC system that exemplify these advantages and improvements of dehumidification performance. FIG. 4 shows calculated latent capacities of the HVAC system 100 with different flows of air through the evaporator bypass line 130 and the supply air recirculation line 120. FIG. 5 shows calculated S/T Ratios of the HVAC system 100 with different flows of air through the evaporator bypass line 130 and the supply air recirculation line 120. As shown in FIGS. 4 AND 5, optimum latent capacity and improved (i.e., lower) S/T Ratio can be achieved by increasing the portion of air diverted through the evaporator bypass line 130. These exemplary performance metrics can be further improved through the synergistic combination of flowing air through both the evaporator bypass line 130 and the supply air recirculation line 120. It should be understood that the above-described advantages are for illustrative purposes. These particular advantages do not need to be achieved in order to realize a benefit from the systems and methods described herein.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

Modifications, additions, or omissions may be made to the systems, apparatus, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

What is claimed is:

1. A heating, ventilation, and air conditioning (HVAC) system comprising:

an evaporator coil disposed between a return air duct and a supply air duct;

a compressor fluidically connected to the evaporator coil;

a blower disposed between the evaporator and the supply air duct, wherein the blower provides a flow of air through the HVAC system;

an evaporator bypass line fluidically connecting the return air duct to an output airstream of the evaporator coil, the evaporator bypass line comprising a bypass damper for adjusting a first flow of air to an input of the evaporator coil and a second flow of air to the output airstream of the evaporator coil via the evaporator bypass line; and a controller operatively coupled to the compressor, the blower, the recirculation damper, and the bypass damper, the controller operable to:

determine an operating mode of the HVAC system;

determine a predetermined threshold ratio value for the operating mode;

determine whether a ratio of a minimum operating flow rate of the blower to a speed of the compressor is greater than the predetermined threshold ratio value for the operating mode; and responsive to a determination that the ratio is greater than the predetermined threshold ratio value, determine a bypass portion of the first flow of air to divert from the return air duct to the output airstream of the evaporator coil based on the speed of the compressor and the predetermined threshold ratio value for the operating mode.

2. The HVAC system of claim 1, wherein the operating mode of the HVAC system is a cooling mode and the predetermined threshold ratio value is a cooling threshold value.

3. The HVAC system of claim 1, wherein the operating mode of the HVAC system is a dehumidification mode and the predetermined threshold ratio value is a dehumidification threshold value.

4. The HVAC system of claim 1, wherein an S/T Ratio of the HVAC system is equal to or less than 0.75.

5. The HVAC system of claim 1, the system further comprising a condenser fluidically connected to the compressor for condensing a refrigerant; and an expansion valve fluidically connected to the condenser and the evaporator coil for increasing a volume of the refrigerant.

6. A method of operating an HVAC system, the method comprising:

fluidically connecting a return air duct to an output airstream of an evaporator coil using an evaporator bypass line;

determining, by a controller of the HVAC system, an operating mode of the HVAC system;

determining, by the controller, a predetermined threshold ratio value for the operating mode;

determining, by the controller, whether a ratio of a minimum operating flow rate of a blower of the HVAC system to a speed of a compressor of the HVAC system is greater than the predetermined threshold ratio value for the operating mode; and responsive to determining that the ratio is greater than the predetermined threshold ratio value, determining, by the controller, a bypass portion of a flow of air to divert from the return air duct to the output airstream of the evaporator coil based on the speed of the compressor and the predetermined threshold ratio value for the operating mode.

7. The method of claim 6, wherein the operating mode of the HVAC system is a cooling mode and the predetermined threshold ratio value is a cooling threshold value.

8. The method of claim 6, wherein the operating mode of the HVAC system is a dehumidification mode and the predetermined threshold ratio value is a dehumidification threshold value.

9. The method of claim 6, wherein an S/T Ratio of the HVAC system is equal to or less than 0.75.

10. The method of claim 6, wherein the HVAC system further comprises a condenser fluidically connected to the compressor for condensing a refrigerant; and an expansion valve fluidically connected to the condenser and the evaporator coil for increasing a volume of the refrigerant.

11. A heating, ventilation, and air conditioning (HVAC) system comprising:

an evaporator coil disposed between a return air duct and a supply air duct;

a compressor fluidically connected to the evaporator coil;

a blower disposed between the evaporator and the supply air duct for providing a flow of air through the HVAC system;

an evaporator bypass line fluidically connecting the return air duct to an output airstream of the evaporator coil, the evaporator bypass line comprising a bypass damper for adjusting a first flow of air to an input of the evaporator coil and a second flow of air to the output airstream of the evaporator coil via the evaporator bypass line; and a controller operatively coupled to the compressor, the blower, and the bypass damper, the controller operable to:

determine an operating mode of the HVAC system;

determine whether the minimum operating flow rate of the blower is greater than a predetermined supply air flow rate of the HVAC system; and responsive to a determination that the minimum operating flow rate of the blower is greater than the predetermined supply air flow rate of the HVAC system, determine a recirculation portion of the first flow of air to divert from the supply air duct to the return air duct based on a difference between the minimum operating flow rate of the blower and the predetermined supply air flow rate of the HVAC system.

12. The HVAC system of claim 11, wherein the operating mode of the HVAC system is a cooling mode and the predetermined threshold ratio value is a cooling threshold value.

13. The HVAC system of claim 11, wherein the operating mode of the HVAC system is a dehumidification mode and the predetermined threshold ratio value is a dehumidification threshold value.

14. The HVAC system of claim 11, wherein an S/T Ratio of the HVAC system is equal to or less than 0.75.

15. The HVAC system of claim 11, the system further comprising a condenser fluidically connected to the compressor for condensing a refrigerant; and an expansion valve fluidically connected to the condenser and the evaporator coil for increasing a volume of the refrigerant.

* * * * *